United States Patent [19]
Sirokorad et al.

[11] 4,024,419
[45] May 17, 1977

[54] APPARATUS FOR DIGITALLY MONITORING AN ANALOG PARAMETER OF AN INDUSTRIAL INSTALLATION

[75] Inventors: Jurij Sirokorad; Jiri Večera, both of Brno, Czechoslovakia

[73] Assignee: Prvni Brnenska strojirna, Brno, Czechoslovakia

[22] Filed: May 25, 1976

[21] Appl. No.: 689,903

[52] U.S. Cl. .............................. 307/308; 307/271; 321/6; 328/1; 328/150; 331/65; 331/107 R; 340/347 AD
[51] Int. Cl.[2] ...................... H03K 3/26; H03K 1/16
[58] Field of Search .......... 307/308, 246, 310, 324, 307/271, 235 B; 328/1, 3, 150; 340/347 AD, 206, 201 R, 209; 321/6; 331/65, 66, 107 R; 324/111, 120, 122, 133

[56] References Cited
UNITED STATES PATENTS

| | | | |
|---|---|---|---|
| 3,725,789 | 4/1973 | Mager | 328/3 |
| 3,731,201 | 5/1973 | Frisbie | 307/246 |

FOREIGN PATENTS OR APPLICATIONS 1,217,688  12/1970  United Kingdom ............... 307/271

*Primary Examiner*—Stanley D. Miller, Jr.

[57] ABSTRACT

An operating parameter such as temperature or pressure is digitally quantized into a plurality of constant-duration first pulses of corresponding amplitude. The first pulses are employed, over the duration of the first pulses, to continually charge a capacitor, which in turn is coupled across an oscillatory discharge path including a diac or other threshold-operated, negative resistance electronic element. The diac is triggered on when the voltage across the capacitor exceeds a predetermined value, and is triggered off again when the voltage thereacross during discharge corresponds to a second predetermined diminished value across the capacitor, thereby effecting the capacitor discharge as a series of constant amplitude relatively short duration pulses whose number is proportional to the amplitude of the first pulse. Advantageously, the second pulses are coupled via a pulse transformer to a full-wave rectifier, and are then routed to a suitable processor for further utilization.

3 Claims, 2 Drawing Figures

4,024,419

APPARATUS FOR DIGITALLY MONITORING AN ANALOG PARAMETER OF AN INDUSTRIAL INSTALLATION

BACKGROUND OF THE INVENTION

The invention relates to circuitry for digitally monitoring analog parameters, such as temperature, pressure or the like, of industrial installations such as turbines and boilers.

Monitoring circuits commonly used in such applications are arranged to produce a plurality of constant-amplitude pulses which are proportional in some way to the instantaneous analog value of the installation quantity to be monitored. Typically, such pulse sequence may be processed in a central computer, which provides control signals to maintain the value of the monitored analog parameter within a required range.

The most common of such monitoring circuits involve the use of relay-type facilities, which in practice have tended to wear quickly and to malfunction under severe ambient conditions of temperature, humidity, vibration and dust. Moreover, such relay-type arrangements are relatively bulky and complex, and consume an inordinate amount of power.

Another common embodiment of such circuit has involved the use of photoelectric techniques. Such facilities have the disadvantage of being relatively inaccurate; moreover, the required lamp sources have been found to have a relatively short life, so that frequent maintenance is necessary.

SUMMARY OF THE INVENTION

Such disadvantages are overcome with an inexpensive, flexible, compact and reliable monitoring circuit constructed in accordance with the invention. In an illustrative embodiment, the continuous analog parameter of the installation to be monitored is sensed by a sampling circuit or the like to yield a succession of relativley long, constant-duration first pulses whose amplitude is indicative of the then-sampled value of the monitored parameter. The output of the sensing and sampling circuit is used to charge a capacitor, whose discharge path includes a diac or other threshold-operated, negative resistance electronic element of the semiconductor type. The diac is advantageously coupled in series with the primary winding of a pulse transformer across the capacitor.

With this arrangement, the discharge circuit for the capacitor operates in an oscillatory fashion, with the discharge commencing when the capacitor voltage exceeds the threshold of the diac and terminating when the resulting voltage across the diac has dropped to a second predetermined value. The result of such oscillatory discharge is the generation of a plurality of short, constant-amplitude, constant-duration pulses whose number is proportional to the then-occurring amplitude of the incident first pulse.

The first pulses are coupled, via the secondary winding of the pulse transformer, to a rectifying circuit, after which they may be conventionally processed in binary form for control of the monitored installation.

BRIEF DESCRIPTION OF THE DRAWING

The invention is further set forth in the following detailed description taken in conjunction with the appended drawing, in which.

DETAILED DESCRIPTION

Figure 1:
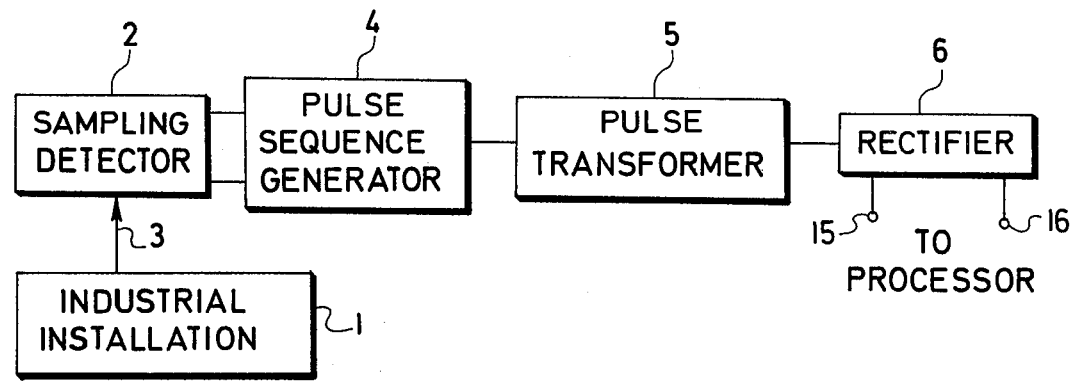
FIG. 1 is a block diagram of a monitoring circuit constructed in accordance with the invention.

Referring now to the drawing, the numeral 1 represents a typical industrial installation, such as a turbine or boiler, exhibiting one or more operating parameters (e.g., temperature, pressure, etc.) which is to be digitally monitored with an arrangement employing the apparatus of the instant invention. A detector 2 is suitably associated, via a connection 3, with the installation 1 to continually detect the parameter to be monitored in the form of an equivalent electrical analog signal, and for this purpose any number of suitable converters or transducers will be apparent to those skilled in the art.

The detector 2 is further provided with suitable conventional sampling facilities for periodically quantizing the instantaneous amplitude of the analog electrical signal, with the generated samples being outpulsed from the detector 2 in the form of constant-duration, relatively long first pulses whose amplitude is proportional to the then-sampled amplitude of the detected analog signal.

The sample pulses from the detector 2 are applied to the input of a pulse sequence generator 4 constructed in accordance with the invention and described in more detail below.

The generator 4 outpulses a sequence of constant-amplitude, constant-duration pulses each of which are short relative to the duration of each of the corresponding sampling pulses from the detector 2. The number of such short pulses at the output of the generator 4 correspond, during each of the constant-interval first pulses, to the sampled amplitude of such first pulse, so that the number of pulses at the output of the generator 4 correspond ultimately to the instantaneous amplitude of the analog parameter of the installation 1 to be monitored.

The sequence of short pulses at the output of the generator 4 are coupled, via an isolating pulse transformer 5, to a rectifier stage 6. The output of the rectifier 6 is a sequence of constant-polarity short pulses suitable for use as binary bits in a central processor (not shown); such processor, in turn, may be adapted to control the generation of the necessary regulation signals which, when applied to the installation 1, maintain the valve of the monitored parameter within predetermined limits. The structure and operation of such processor and regulation signal generator, and the manner in which such devices operate to control the installation parameter, are conventional in nature.

Figure 2:
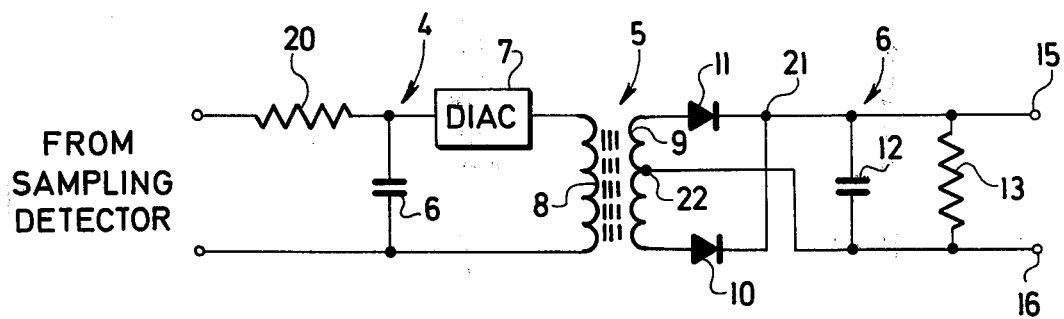
FIG. 2 is a combined block and schematic diagram, illustrating further details of certain of the components of FIG. 1.

One embodiment of the sequence generator 4, and its association with the following subassemblies 5 and 6, is shown shown in FIG. 2. The variable-amplitude sampled pulse sequence from the detector are employed to charge a capacitor 6 through a charging resistor 20. The voltage obtained across the capacitor during such charging operation will, of course, be dependent on the then-occurring amplitude of the incoming pulses.

Connected across the capacitor 6 is a discharge path including a two-terminal, threshold-operated negative resistance element of the semiconductor type, illustratively a diac 7, and a primary winding 8 of the isolating pulse transformer 5. The presence of the diac 7 effects a relaxation-type discharge of the capacitor 6. In particular, when the capacitor 6 has charged during the occurrence of a detected pulse sample to a predetermined value corresponding to the threshold level at which the diac is triggered on, the diac is switched into conduction to initiate discharge of the capacitor 6.

The discharge operation proceeds until the voltage across the capacitor 6 has fallen to a value that is insufficient to hold the diac in its conductive state, whereupon the diac is switched off to stop the discharge operation. However, because of the continued presence of the relatively long first pulse from the sampling detector 2, the capacitor 6 instantly recharges again up to the threshold value of the diac 7, whereby the relaxation-type discharge of the capacitor occurs again in an identical manner.

The result of such periodic discharge is to pass pulse-like surges of current successive through the primary winding 8 to form the above-mentioned sequence of short impulses, such surges being effective to produce, on a secondary winding 9 of the transformer 5, a corresponding succession of well-formed substantially rectangular pulses of short duration. Since each instant of current reversal through the primary winding 8 will yield a steep pulse on the secondary winding 9, a full-wave rectifier including a pair of diodes 10, 11 are connected in phase opposition across the secondary winding 9.

A junction 21 of like electrodes (illustratively cathodes) of the diodes 10 and 11 are connected through a capacitor 12 to a center tap 22 of the secondary winding 9 in a conventional manner. A resistor 13 is connected in parallel with the capacitor 12. The resulting full-wave rectifying and filter action provided by the stage 6 will be effective to provide the constant-polarity, binary bit-type pulses described below at a pair of output terminals 15, 16 of the depicted apparatus.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an apparatus for digitally monitoring an analog operating parameter of an industrial installation, sensing means coupled to the installation and repetitively operable for generating a succession of relatively long constant-duration first pulses each having an amplitude proportional to the then-occurring value of the operating parameter, a capacitor, means for coupling the output of the sensing means across the capacitor to charge the capacitor, a capacitor discharge circuit including a two-terminal, threshold-operated negative resistance electronic element coupled to the capacitor for effecting discharge of the capacitor in the form of a plurality of relatively short duration, constant-amplitude second pulses occurring over the duration of each first pulse, the number of second pulses occurring during each first pulse being proportional to the amplitude of such first pulse, and means coupled to the output of the discharge circuit for rectifying the successive second pulses.

2. Apparatus as defined in claim 1, in which the negative resistance element is a diac adapted to be triggered on to initiate capacitor discharge when the voltage accumulated across the capacitor during charge exceeds a first predetermined value and further adapted to be triggered off when the voltage across the capacitor during such discharge has dropped to a second predetermined value.

3. Apparatus as defined in claim 1, in which the discharge circuit further comprises a pulse transformer having a primary winding serially connected with the negative resistance element, the transformer further having a secondary winding coupled to the input of the rectifying means.

* * * * *